US006293366B1

(12) United States Patent
Chabaan et al.

(10) Patent No.: US 6,293,366 B1
(45) Date of Patent: Sep. 25, 2001

(54) VEHICLE ELECTRIC POWER ASSIST STEERING SYSTEM AND METHOD USING ANGLE BASED TORQUE ESTIMATION

(75) Inventors: Rakan C. Chabaan, Farmington Hills; Le Yi Wang, Novi, both of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/505,641

(22) Filed: Feb. 16, 2000

(51) Int. Cl.[7] .......................... A01B 69/00; B62D 11/00; B62D 5/04
(52) U.S. Cl. ............................ 180/446; 180/443; 701/41
(58) Field of Search ...................... 180/444, 422, 180/443, 446, 415, 412; 318/432, 433; 701/41, 42

(56) References Cited

U.S. PATENT DOCUMENTS

| 4,703,821 | 11/1987 | Shimizu | 180/79.1 |
| 4,840,389 | 6/1989 | Kawabe et al. | 280/91 |
| 4,871,039 | 10/1989 | Daido et al. | 180/79.1 |
| 4,979,114 | * 12/1990 | Oshita | 364/424.05 |

(List continued on next page.)

FOREIGN PATENT DOCUMENTS

03056084 * 3/1991 (JP).
411059447 * 3/1999 (JP).

OTHER PUBLICATIONS

Sugitani, Nobuo; Fujuwara, Yukihiro; Uchinda, Kenko; and Fujita, Masayuki, "Electric Power Steering with H–infinity Control Designed to Obtain Road Information" Proc. Of the ACC, Albuquerque, New Mexico, Jun. 1997, 5 pages.

Adams, F.J., "Power Steering 'Road Feel'" SAE Paper 830998, 1983, 9 pages.

Baxter, John, "Analysis of Stiffness and Feel for a Power–Assisted Rack and Pinion Steering Gear" SEA Paper 880706, 1998, 7 pages.

Zaremba, A.T.; Liubakka, M.K.; and Stuntz, R.M., "Control and Steering Feel Issues in the Design of an Electric Power Steering System" Proc. Of the ACC, 1998, 5 pages.

Zaremba, A.T.; Liubakka, M.K.; and Stuntz, R.M., "Vibration Control Based on Dynamic Compensation in an Electric Power Steering System" Prepr. Of the Int. Conf. On Control of Oscillations and Chaos, St. Petersburg, vol. 3, 1997, pp. 453–456.

Zaremba, A. and Davis, R.I., "Dynamic Analysis and Stability of a Power Assist Steering System" Proc. Of the ACC, Seattle, Washington, Jun. 1995, pp. 4253–4257.

*Primary Examiner*—J. J. Swann
*Assistant Examiner*—David Divine
(74) *Attorney, Agent, or Firm*—Gregory Brown

(57) ABSTRACT

A steering system (10) and method (70) for controlling the steering of a vehicle having a steering wheel (12), a steering column (14) connected to said steering wheel (12), and an electric motor (20) operatively engaged with the steering column (14) for supplying torque assist. A steering angle sensor (32) is employed for sensing an angular position $\theta_c$ of the steering wheel (12). The system has a torque estimator (40) for determining an estimated torque signal ($T_d$est) as a function of the measured steering wheel angle, and a motor controller (30) for generating a motor control signal (U) as a function of said estimated torque. Accordingly, the present invention reduces the complexity and cost of the electric power assist steering system by eliminating the need for a conventional pinion torque sensor, without sacrificing vehicle steering performance.

19 Claims, 4 Drawing Sheets

U.S. PATENT DOCUMENTS

| | | | |
|---|---|---|---|
| 5,038,269 | 8/1991 | Grimble et al. | 364/148 |
| 5,182,711 * | 1/1993 | Takahashi | 364/424.05 |
| 5,202,830 | 4/1993 | Tsurumiya et al. | 364/424.05 |
| 5,353,882 * | 10/1994 | Inoue | 173/176 |
| 5,627,750 | 5/1997 | Kono et al. | 364/424.096 |
| 5,631,529 | 5/1997 | Shimizu et al. | 318/432 |
| 5,642,722 | 7/1997 | Schumacher et al. | 123/673 |
| 5,690,087 | 11/1997 | Schumacher et al. | 123/675 |
| 5,697,867 | 12/1997 | Kono et al. | 477/176 |
| 5,719,766 * | 2/1998 | Bolourchi | 364/424.052 |
| 5,732,373 | 3/1998 | Endo | 701/42 |
| 5,809,438 | 9/1998 | Noro et al. | 701/41 |
| 5,819,714 | 10/1998 | Bush et al. | 123/673 |
| 5,836,418 | 11/1998 | Kim | 180/422 |
| 5,857,443 | 1/1999 | Kono et al. | 123/339.2 |
| 5,859,774 | 1/1999 | Kuzuya et al. | 364/176 |
| 5,861,725 | 1/1999 | Endo et al. | 318/434 |
| 5,908,457 | 6/1999 | Higashira et al. | 701/41 |
| 5,927,430 * | 7/1999 | Mukai | 180/446 |
| 6,079,513 * | 6/2000 | Nishizaki | 180/402 |
| 6,091,214 * | 7/2000 | Yamawaki | 318/52 |
| 6,144,909 * | 11/2000 | Chabaan et al. | 701/41 |
| 6,148,949 * | 11/2000 | Kobayashi | 180/446 |

* cited by examiner

VEHICLE ELECTRIC POWER ASSIST STEERING SYSTEM AND METHOD USING ANGLE BASED TORQUE ESTIMATION

CROSS REFERENCE TO RELATED APPLICATIONS

This application is related to co-pending U.S. application Ser. Nos. 09/504,743 and 09/505,373, entitled "VEHICLE ELECTRIC POWER ASSIST STEERING SYSTEM AND METHOD USING H-INFINITY CONTROL" and "VEHICLE ELECTRIC POWER ASSIST STEERING SYSTEM AND METHOD USING VELOCITY BASED TORQUE ESTIMATION," respectively, all filed on the same date and assigned to the assignee of the present application.

FIELD OF THE INVENTION

The present invention generally relates to vehicle steering systems, and more particularly relates to an electric power assist steering system and method of controlling electric power steering assist for a steered vehicle.

BACKGROUND OF THE INVENTION

Conventional steering of a wheeled motor vehicle is typically achieved by the vehicle operator (driver) rotating a steering wheel that is arranged in the passenger compartment of the vehicle to turn the steerable road wheels. Conventional steering systems generally include a rack and pinion type steering assembly operatively coupled to the road wheels and a steering column coupled between the steering wheel and the rack and pinion assembly for converting angular rotation of the steering wheel into a sliding motion on the rack to effect steering operation of the road wheels. In order to reduce the amount of driver effort (i.e., torque) that is required to rotate the steering wheel conventional steering systems typically include a power assisted actuator that assists the operator with rotation of the steering wheel to overcome opposing forces such as road load forces on the road wheels and friction forces in the steering assembly. The amount of power assistance generally varies depending on the speed of the vehicle and the amount of effort applied by the vehicle operator to the steering wheel. Conventional power assist steering systems typically employ either hydraulic power assist or electric power assist. In contrast to hydraulic power assist systems, the electric power assist steering system offers variable assist capabilities, more efficient energy consumption, reduced mechanism complexity, increased reliability, and responsive on-demand steering assist, as well as other advantages.

The electric power assist steering (EPAS) system employs an electric motor for applying a controlled amount of torque to the steering assembly to assist the operator with angular rotation of the steering wheel. The conventional electric power assist steering system is generally configured with a feedback control system that electrically amplifies the driver steering torque input to the steering system to realize improved steering comfort and performance. The electric power assist steering system typically includes a rotatable steering wheel, a steering column, a rack and pinion assembly, a gear box assembly, and an electric motor. The conventional electric power assist steering system also employs a pinion torque sensor, as well as various other sensors. The pinion torque sensor is generally located between the steering column and the rack and pinion assembly and senses the amount of torque applied at the pinion. The measured pinion torque serves as an approximation of the input torque applied to the steering wheel by the vehicle operator and is commonly used to determine the amount of torque assist to be provided by the electric motor. The amount of torque assist is typically calculated from a tunable non-linear boost curve which generates a control command signal to control the electric motor to achieve the desired level of power steering assist.

While the employment of a pinion torque sensor for measuring pinion torque is typically acceptable for controlling the amount of power steering assist provided by the electric motor during steady state operation, the conventional torque sensor is relatively expensive and therefore adds to the overall cost and complexity of the steering system. Additionally, the pinion torque measurement typically deviates dramatically from the actual driver applied torque during dynamic transients, particularly when the amount of motor generated assist torque is significant, thereby not permitting optimal steering assist.

Accordingly, it is desired to provide for an electric power assist steering system for a vehicle that provides torque assist to the vehicle operator at a reduced cost. In particular, it is desired to provide for an electric power assist steering system for controlling the amount of electric power assist without requiring the use of a torque sensor. It is further desirable to achieve optimal steering assist performance with an electric power assist steering system.

SUMMARY OF THE INVENTION

In accordance with the teachings of the present invention, a steering system and method of controlling the steering of a vehicle are provided. According to one aspect of the present invention, an electric power assist steering system is provided having a steering assembly including a steering wheel connected to a steering column, and an electric motor operatively engaged with the steering assembly for supplying torque assist. A steering angle sensor is employed for sensing an angular position of the steering assembly. The steering system has a torque estimator for determining an estimated torque signal as a function of the sensed angular position of the steering assembly, and a motor controller for generating a motor control signal as a function of the estimated torque.

According to another aspect of the present invention, a method is provided which includes the steps of sensing angular position of the steering assembly, estimating a torque signal as a function of the sensed angular position, generating a motor control signal as a function of the estimated torque, and applying the motor control signal to an electric motor to generate steering torque assist. Accordingly, the system and method of the present invention reduces the complexity and cost of the electric power assist steering system by eliminating the need for a pinion torque sensor, without sacrificing vehicle steering performance.

These and other features, advantages and objects of the present invention will be further understood and appreciated by those skilled in the art by reference to the following specification, claims and appended drawings.

DETAILED DESCRIPTION OF THE PREFERRED EMBODIMENT

Figure 1:
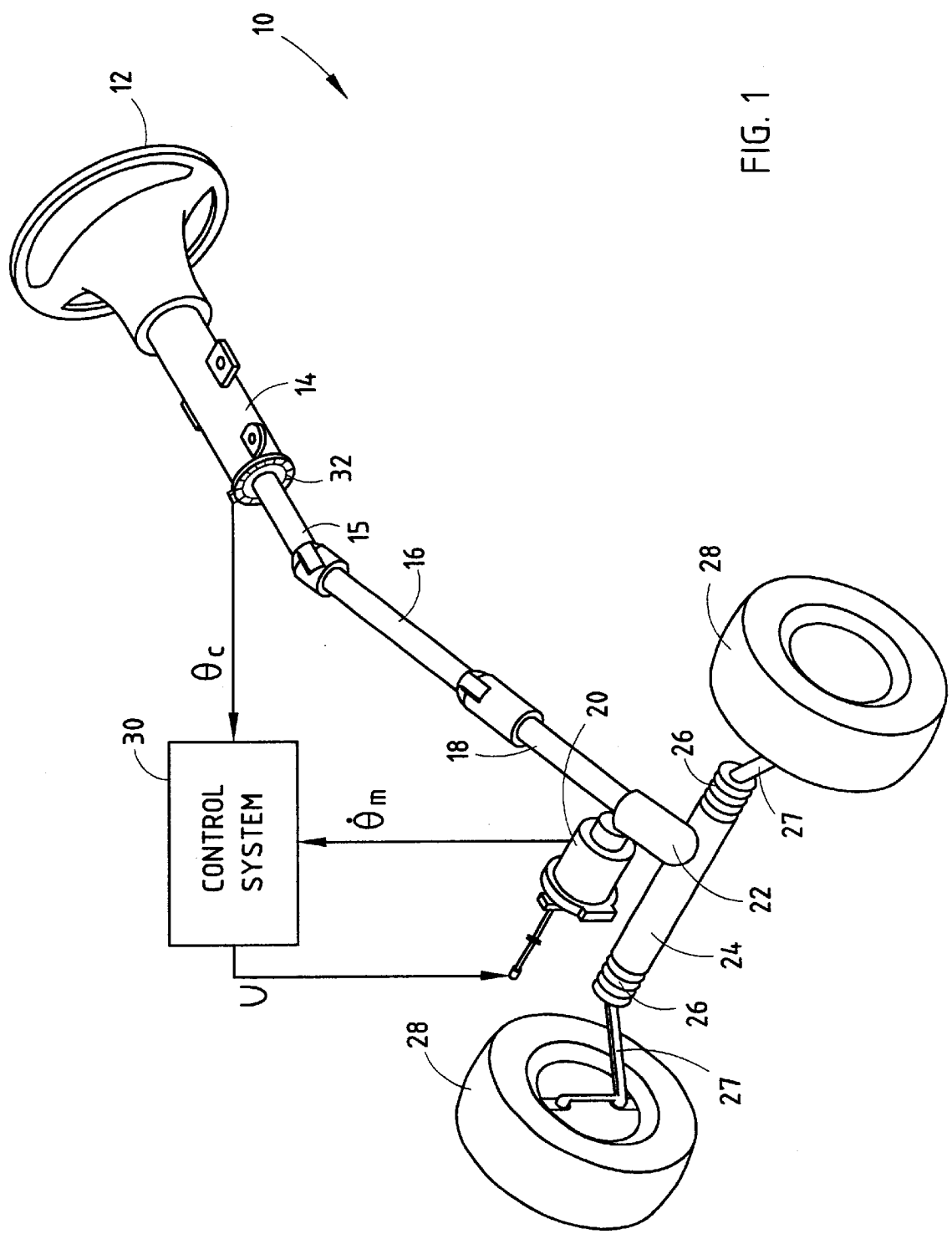
FIG. 1 is a diagrammatic view of an electric power assist steering system for a wheeled vehicle according to the present invention.

Referring to FIG. 1, an electric power assist steering (EPAS) system 10 equipped with a control system 30 according to the present invention is illustrated for use in steering a wheeled vehicle, such as a motor vehicle. The steering system 10 is described herein in connection with the power assisted steering of a pair of road wheels 28, such as the front wheels of the motor vehicle, adapted to be engaged in friction contact with the ground, such as a roadway. However, it should be appreciated that the steering system 10 of the present invention may be employed to steer any number of front and/or rear wheels of a steered vehicle.

The electric power assist steering system 10 has a steering assembly which includes a rotatable steering wheel 12 that is generally disposed in the passenger compartment of the vehicle and is manually rotatable by the driver of the vehicle to steer the road wheels 28. The steering assembly also includes a steering column 14 operatively coupled to steering wheel 12. The steering column 14 has a rotary shaft 15 that rotates in synchronization with the steering wheel 12. Shaft 15 is preferably directly connected to steering wheel 12. The steering assembly as shown employs an intermediate shaft 16 and a pinion shaft 18, both operatively engaged with steering column 14. Steering column 14, intermediate shaft 16, and pinion shaft 18 are preferably interconnected via universal joints as is well-known in the vehicle steering art. While steering column 14, intermediate shaft 16, and pinion shaft 18 are shown in this example, it should be appreciated that any number of rotating shafts and various mechanical assemblies may be coupled to steering wheel 12 to actuate the steerable road wheels 28 in response to actuation of steering wheel 12.

An electric motor 20 is coupled to the pinion shaft 18 to provide torque assist to shaft 18 such as to assist the driver of the vehicle in rotating the steering wheel 12. The electric motor 20 provides power (torque) assist to aid in the steering of the road wheels 28 so as to reduce the amount of effort required by the driver. Power steering assist reduces the effects of steering assembly friction and road load. The pinion shaft 18 is coupled at one end to a pinion gear assembly 22 for converting angular rotation of the pinion shaft 18 to linear movement on a rack 24. The rack 24 is coupled on opposite ends to tie rods 26 and connector rods 27 which are movable to control left and right rotation of road wheels 28. It should be appreciated that the steering wheel 12, steering column 14, shafts 16 and 18, pinion gear assembly 22, rack 24, tie rods 26, connector shafts 27, and road wheels 28 may include a conventional vehicle steering assembly.

The electric power assist steering system 10 has a control system 30 that controls the amount of torque generated by the electric motor 20. Control system 30 preferably includes one or more microprocessor based controllers having memory programmed to operate control routines, process input signals, estimate torque signals, and generate control signals for controlling the electric motor input command signal U to achieve the desired torque assist $T_a$. The control system 30 is preferably configured with feedback control and feedforward control as described herein. While control system 30 employs one or more programmed controllers, it should be appreciated that various analog and digital circuits could be employed to estimate torque and control the electric motor power assist without departing from the teachings of the present invention.

In addition, steering system 10 further includes a steering angle sensor 32 for measuring the steering column position angle $\theta_c$. The steering angle sensor 32 senses angular position of the rotatable shaft 15 of the steering column 14. The measured steering column position angle $\theta_c$ provides a measurement of the angular position of the steering wheel 12. The measured steering column angle $\theta_c$ is input to the control system 30 and is used to estimate torque signals according to the present invention. The control system 30 also monitors the angular velocity $\dot{\theta}_m$ of electric motor 20. The electric motor velocity $\dot{\theta}_m$ may be measured directly from the electric motor input command signal U, or may be remotely sensed by an angular position sensor or angular speed sensor.

Figure 2:
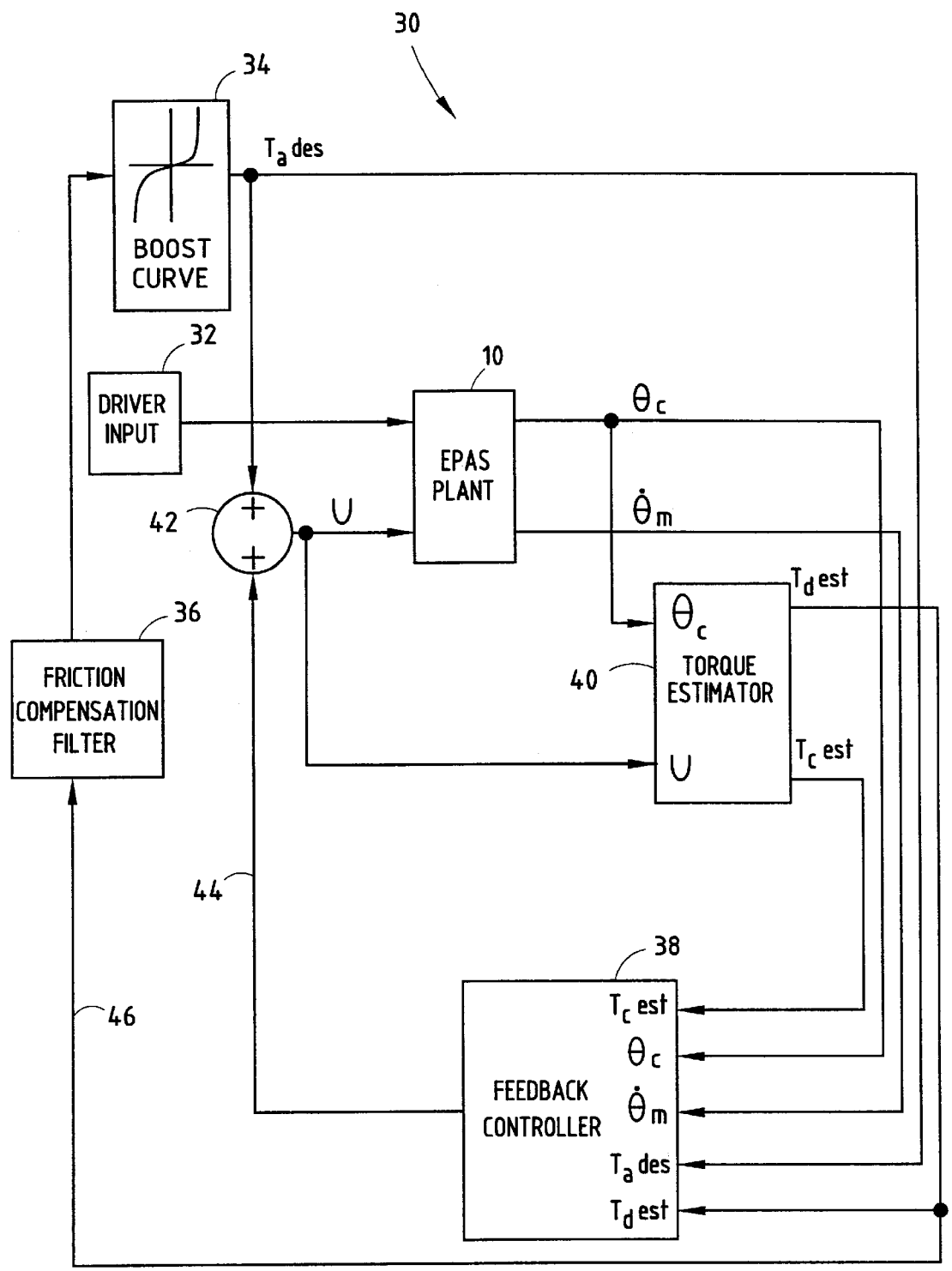
FIG. 2 is a block diagram of the control system for controlling the electric power assist steering system.

Referring to FIG. 2, the control system 30 is illustrated therein for controlling the electric power assist steering system 10 according to the present invention. The control system 30 is shown made up of various control devices, each programmed with control routines for performing one or more designated control functions to generate a desired electric motor torque assist to achieve enhanced vehicle steering performance. As shown, the control system 30 incorporates a function block 10 representative of the electric power steering assist system shown having a driver input 32 which is the driver applied torque. The electric power assist steering system 10 receives the driver input 32 in the form of a torque applied to the steering wheel 12. In addition, steering system 10 receives a motor input command signal U. Electric power assist steering system 10 further produces the sensed steering wheel position angle $\theta_c$ and electric motor speed $\dot{\theta}_m$.

The control system 30 includes a non-linear boost curve look-up table 34 which receives an estimated driver torque signal and generates a feedforward signal that is added to a feedback signal to produce the motor input command signal U. Boost curve look-up table 34 preferably includes a non-linear boost curve which maps the amount of motor input command signal U versus estimated driver torque $T_d$est at various vehicle speeds. Accordingly, the boost curve is responsive to a sensed vehicle speed (not shown).

The control system 30 further includes a torque estimator 40 for estimating the driver torque $T_d$est applied to the steering wheel 12, and for further estimating the pinion torque $T_c$est applied to the pinion shaft 18. The torque estimator 40 receives, as inputs, the sensed angular position $\theta_c$ of the steering column and the electric motor input command signal U. It should be appreciated that, by estimating the driver torque $T_d$est and pinion torque $T_c$est, the torque estimator 40 provides torque estimations which allow for elimination of a conventional pinion torque sensor, thereby reducing the overall cost and complexity of the steering system 10.

The control system 30 further includes a feedback controller 38 coupled in a feedback loop 44. Feedback controller 38 receives, as inputs, the estimated driver torque $T_d$est and estimated pinion torque $T_c$est, as well as the sensed angular position $\theta_c$, the motor angular velocity $\dot{\theta}_m$, and the desired torque $T_d$est. In response to the inputs, feedback controller 38 produces a feedback signal in feedback loop 44 that is summed with the feedforward signal $T_a$des at summer 42.

Summer 42 sums the feedback signal on feedback loop 44 with the feedforward signal on feedforward loop 46 to produce the motor input command signal U that drives the electric motor 20.

The feedforward loop 46 includes a friction compensation filter 36 which receives the estimated driver torque $T_d$est and filters out the undesired high frequency signals to compensate for friction forces, such as road load friction and steering column friction. The friction compensation filtered output is supplied as an input to the boost curve look-up table 34 which in turn produces the desired torque signal $T_d$des. Accordingly, the control system 30 includes both a feedback loop 44 and feedforward loop 46. It should be appreciated that the feedback loop 44 advantageously provides robust stability of the closed-loop system and allows for compensation for component changes, while the feedforward loop 46 provides fast steady state response and attenuation of friction. Accordingly, if the torque estimator 40 fails to perform the intended operation, the control system 30 will remain stable. Similarly, if the feedback loop 44 fails to perform the closed-loop system will likewise remain stable.

Figure 3:
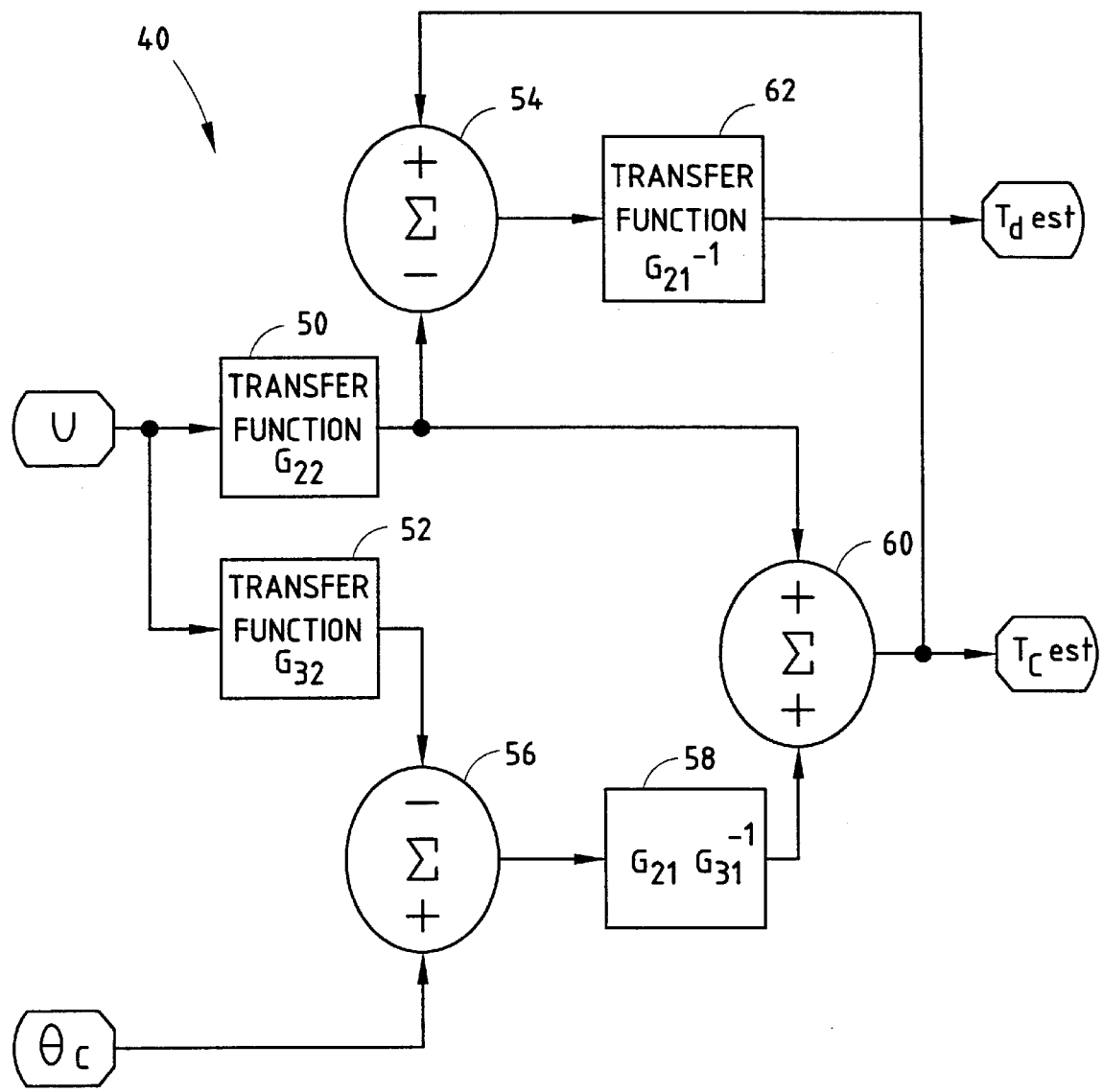
FIG. 3 is a block diagram illustrating functions of the torque estimator for estimating driver torque and pinion torque according to the present invention.

With particular reference to FIG. 3, the torque estimation functions performed by the torque estimator 40 are shown in detail for determining the estimated driver torque $T_d$est and estimated pinion torque $T_c$est. The torque estimator 40 includes a number of function blocks containing measured transfer functions including $G_{21}$, $G_{21}^{-1}$, $G_{22}$, $G_{31}^{-1}$, and $G_{32}$. The transfer functions $G_{21}$, $G_{21}^{-1}$, $G_{22}$, $G_{31}^{-1}$, and $G_{32}$ are measured based on the dynamic relationship of selected steering system outputs divided by selected inputs, and are defined as follows. Transfer function $G_{31}$ is the relationship of the steering angle output $\theta_c$ divided by the driver torque input $T_d$. Transfer function $G_{32}$ is the relationship of the steering angle output $\theta_c$ divided by the motor control input command signal U. Transfer function $G_{21}$ is the relationship of the pinion torque output $T_c$ divided by the driver torque input $T_d$. Transfer function $G_{22}$ is the relationship of the pinion torque output $T_c$ divided by the motor input control command signal U.

The torque estimator 40 receives as inputs the motor input command signal U and the sensed angular position signal $\theta_c$. The motor input command signal U is input to transfer function $G_{22}$ in function block 50 and is also input to transfer function $G_{32}$ in function block 52. The output of function block 50 is input to a negative input of summer 54 and to a positive input of summer 60, while the output of function block 52 is input to a negative input of summer 56. Summer 56 subtracts the output of function block 52 from the measured steering column angular position $\theta_c$ and provides the resultant subtraction as an input to function block 58. Function block 58 includes the product of transfer function $G_{21}$, and $G_{31}^{-1}$. $G_{31}^{-1}$ is the inverse of transfer function $G_{31}$, The output of function block 58 is input to a positive input of summer 60, while the other positive input of summer 60 receives the output of function block 50. Summer 60 sums the two inputs to produce the estimated pinion torque $T_c$est, which is one output of torque estimator 40.

The estimated pinion torque $T_c$est is further input to a positive terminal of summer 54. Accordingly, summer 54 subtracts the output of function block 50 from the estimated pinion torque $T_c$est and provides the subtraction as an input to function block 62. Function block 62 includes a transfer function $G_{21}^{-1}$, which is the inverse of transfer function $G_{21}$, and produces the estimated driver torque $T_d$est, as a second output of torque estimator 40. Accordingly, the torque estimator 40 estimates both a driver torque estimate $T_d$est, as well as a pinion torque estimate $T_c$est, which are then used to generate the motor control command signal U to control the electric power assist steering system 10 according to the present invention.

The torque estimator 40 is designed to perform torque estimations based on the torque estimation functions which can also be represented as follows:

$$T_d est = [T_c est - G_{22} U][G_{21}]^{-1} \quad (1)$$

$$T_c est = G_{21}[[G_{31}]^{-1}(\Theta_c - G_{32} U)] + G_{22} U \quad (2)$$

The resultant torque estimation equations (1) and (2) are derived from modeling dynamic relationships of the steering system which are established based on Newton's laws of motion. The dynamic model of the steering system is defined by the measured transfer functions as described above. By measuring the motor control input current U and steering angle position $\theta_c$, the estimated driver torque $T_d$est and estimated pinion torque $T_c$est are computed, without requiring a direct measurement of torque with a torque sensor.

Figure 4:
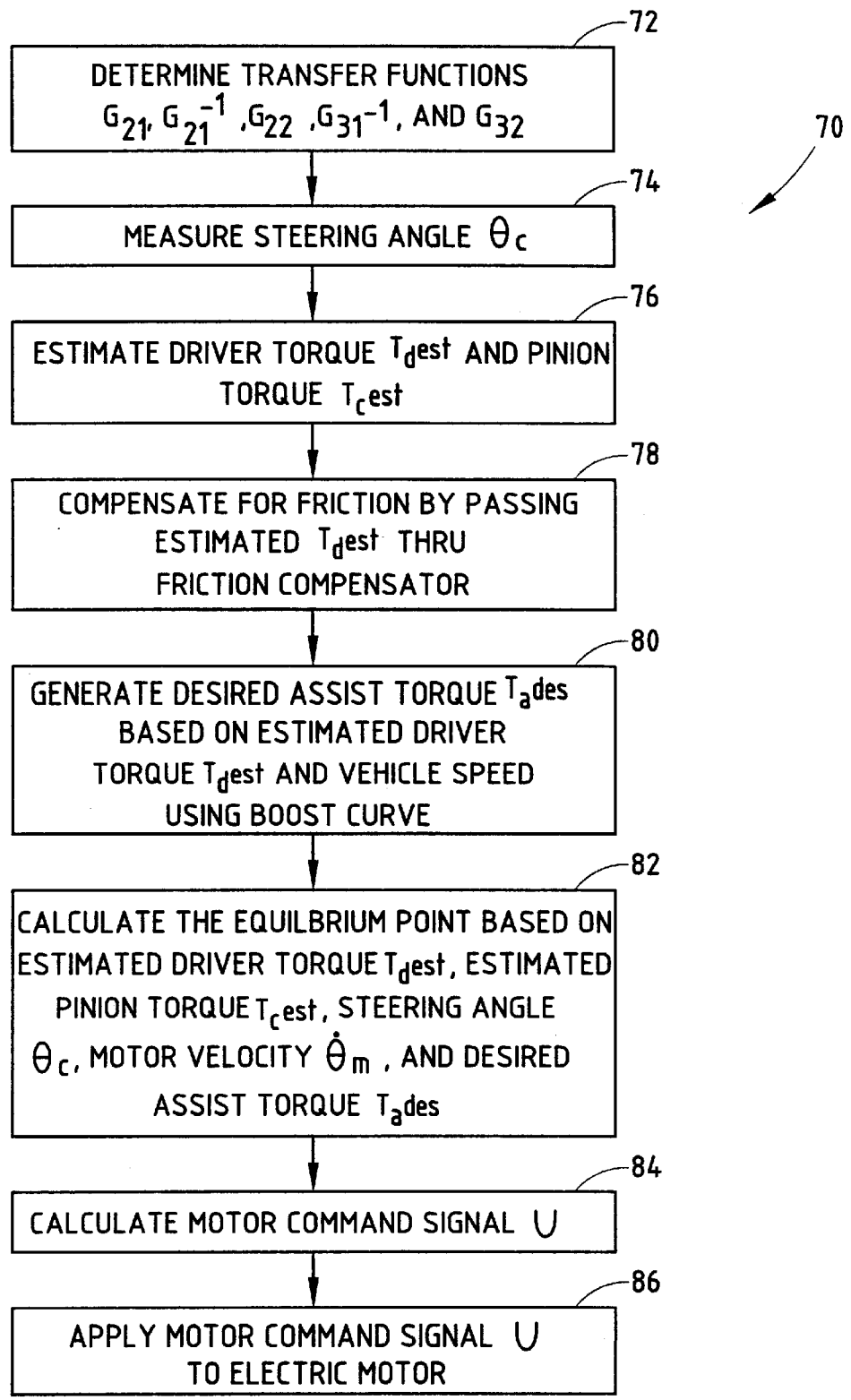
FIG. 4 is a flow diagram illustrating a methodology for controlling the electric power assist steering system according to the present invention.

Referring to FIG. 4, a control methodology 70 for controlling the electric power assist steering system 10 with the control system 30 of the present invention is illustrated therein. The control methodology 70 include step 72 of determining each of transfer functions $G_{21}$, $G_{21}^{-1}$, $G_{22}$, and $G_{32}$. The transfer functions can be determined with the steering system off line by applying a known driver torque input to the steering wheel and measuring selected inputs and outputs and then computing the transfer function by dividing the selected output over the selected input for the corresponding defined functions. Once the transfer functions are determined, methodology 70 proceeds to step 74 to measure the steering angle $\theta_c$ with steering angle sensor 32. In step 76, the estimated driver torque $T_d$est and estimated pinion torque $T_c$est are determined by the torque estimator 40. In step 78, the estimated driver torque $T_d$est is compensated for friction forces in the feedforward loop 46 by passing the estimated torque $T_d$est through the friction compensation filter. In step 80, the desired assist torque $T_d$est is generated based on estimated driver torque $T_d$est and vehicle speed according to the mapped data provided in the boost curve. An optional step 82 is provided for calculating the equilibrium point based on the estimated driver torque $T_d$est, estimated pinion torque $T_c$est, steering angle $\theta_c$, motor velocity $\dot{\theta}_m$, and desired assist torque $T_a$des. It should be appreciated that by providing for an equilibrium point, the present feedback signal more accurately determines the driver torque by providing an average signal to allow for the realization of smooth transitions during dynamic transitions of the vehicle operation. Finally, control methodology 70 proceeds to step 84 to calculate the motor command signal U to control the electric motor to achieve a controlled amount of power steering assist. It should be appreciated that the motor command signal U is applied to motor in step 86.

Accordingly, the electric power assist steering system 10 of the present invention advantageously provides for electric power steering assist to a steering system of a vehicle by estimating the torque applied to the steering system by the driver, without requiring a conventional pinion torque sensor. By eliminating the need for a conventional pinion torque sensor, the present invention advantageously reduces the cost and complexity of the steering system. At the same time, the torque estimation provides for fast and stable control without sacrificing steering performance. While one example of a steering assembly is shown herein, it should be appreciated that other steering assemblies may be employed in connection with the control system described herein without departing from the spirit of the present invention.

It will be understood by those who practice the invention and those skilled in the art, that various modifications and improvements may be made to the invention without departing from the spirit of the disclosed concept. The scope of protection afforded is to be determined by the claims and by the breadth of interpretation allowed by law.

The invention claimed is:

1. An electric power assist steering system for a vehicle, comprising:
   a steering assembly including a steering wheel connected to a steering column;
   a steering angle sensor for sensing an angular position of the steering assembly;
   an electric motor operatively engaged with said steering assembly for supplying steering torque assist;
   a torque estimator for estimating a torque signal as a function of said sensed angular position of the steering assembly, wherein the steering system does not include a torque sensor; and
   a controller for generating a motor control signal as a function of said estimated torque for controlling the electric motor.

2. The system as defined in claim 1, wherein said torque estimator determines said estimated torque signal further as a function of the motor control signal input to the electric motor.

3. The system as defined in claim 2, wherein said torque estimator determines the estimated torque signal further as a function of one or more steering system transfer functions.

4. The system as defined in claim 1, wherein said torque estimator estimates a driver torque signal and a pinion torque signal.

5. The system as defined in claim 1, wherein said controller includes a feedback controller and a feedforward controller.

6. The system as defined in claim 5 further comprising a friction compensation filter coupled to said feedforward controller.

7. The system as defined in claim 1, wherein said steering angle sensor senses angular position of the steering column.

8. The system as defined in claim 1, wherein said steering assembly further includes a shaft operatively coupled to the steering column and further connected to a rack and pinion assembly, wherein said electric motor is coupled to said shaft.

9. The system as defined in claim 1, wherein said system is provided without a pinion torque sensor.

10. A control system for controlling electric motor torque assist to an electric power assisted steering system for a vehicle having a steering assembly including a steering wheel connected to a steering column and an electric motor operatively engaged with the steering assembly for supplying steering torque assist, wherein said control system comprises:
   a steering angle sensor for sensing an angular position of the steering assembly;
   a torque estimator for estimating a torque signal as a function of said sensed angular position of the steering assembly, wherein the steering system does not include a torque sensor; and
   a controller for generating a motor control signal as a function of said estimated torque for controlling the electric motor.

11. The control system as defined in claim 10, wherein said torque estimator determines said estimated torque signal further as a function of the motor control signal input to the electric motor.

12. The control system as defined in claim 11, wherein said torque estimator determines the estimated torque signal further as a function of one or more steering system transfer functions.

13. The control system as defined in claim 10, wherein said torque estimator estimates a driver torque signal and a pinion torque signal.

14. A method of controlling an electric power assisted steering system having a steering assembly including a steering wheel connected to a steering column for a vehicle, and wherein said steering system does not include a torque sensor, said method comprising the steps of:
   sensing an angular position of the steering assembly;
   estimating a torque signal as a function of said sensed angular position of the steering assembly;
   generating a motor control signal as a function of said estimated torque for controlling an electric motor; and
   applying said motor control signal to an electric motor to generate a controlled amount of steering torque assist.

15. The method as defined in claim 14, wherein said step of estimating a torque signal further comprises estimating the torque signal as a function of the motor control signal input to the electric motor and one or more predetermined transfer functions.

16. The method as defined in claim 14, wherein said step of estimating a torque signal further comprises estimating a driver torque signal and estimating a pinion torque signal.

17. The method as defined in claim 14, wherein said step of generating a motor control signal includes generating a feedforward signal and a feedback signal.

18. The method as defined in claim 14, wherein said step of sensing angular position comprises sensing angular position of the steering column.

19. The method as defined in claim 14, wherein said step of estimating a torque signal is performed without employing a pinion torque sensor.

* * * * *